United States Patent
Liang (10) Patent No.: US 10,313,598 B2
(45) Date of Patent: Jun. 4, 2019

(54) VIDEO CAMERA, SETTING METHOD AND ADJUSTING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hsiao-Lung Liang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 115 days.

(21) Appl. No.: 15/428,202

(22) Filed: Feb. 9, 2017

(65) Prior Publication Data

US 2018/0084200 A1  Mar. 22, 2018

(30) Foreign Application Priority Data

Sep. 22, 2016 (CN) .......................... 2016 1 0842351

(51) Int. Cl.
*H04N 5/232* (2006.01)
*G03B 17/56* (2006.01)
(Continued)

(52) U.S. Cl.
CPC .......... *H04N 5/23296* (2013.01); *F16B 1/00* (2013.01); *F16M 11/041* (2013.01);
(Continued)

(58) Field of Classification Search
CPC .......... H04N 5/23296; H04N 5/23216; H04N 5/225; G03B 17/02; G03B 17/561; F16M 11/041
See application file for complete search history.

(56) References Cited

U.S. PATENT DOCUMENTS

| | | | | |
|---|---|---|---|---|
| 2003/0085997 A1* | 5/2003 | Takagi | ................. | G11B 27/031 348/143 |
| 2003/0194230 A1* | 10/2003 | Tamura | .............. | G08B 13/1963 396/427 |
| 2009/0233645 A1* | 9/2009 | Takamatsu | ............. | H01Q 1/125 455/561 |
| 2010/0128126 A1* | 5/2010 | Takeuchi | ........... | G08B 13/1961 348/143 |

(Continued)

FOREIGN PATENT DOCUMENTS

TW  201617755 A  5/2016

OTHER PUBLICATIONS

TIPO Office Action dated Dec. 27, 2017 in Taiwan application (No. 105130611).

*Primary Examiner* — Abdelaaziz Tissire
(74) *Attorney, Agent, or Firm* — McClure, Qualey & Rodack, LLP (57) ABSTRACT

A video camera, a setting method and an adjusting method thereof are provided. The adjusting method of the video camera is for adjusting an installation position of the video camera on a stand. The adjusting method comprises following steps: A first vector set of a gravity acceleration on three coordinate axes pre-stored in the video camera is obtained. An angle, a direction or a position of the video camera is adjusted. A second vector set of the gravity acceleration of the video camera on the coordinate axes is obtained by an accelerometer. Whether the second vector set is substantially the same as the first vector set is determined. When the second vector set is substantially the same as the first vector set, it is concluded that an installation position of the video camera on the stand is completely adjusted.

11 Claims, 10 Drawing Sheets

(51) Int. Cl.
*F16M 11/04* (2006.01)
*F16B 1/00* (2006.01)
*F16M 11/12* (2006.01)
*G03B 17/02* (2006.01)

(52) U.S. Cl.
CPC ......... *F16M 11/125* (2013.01); *G03B 17/561* (2013.01); *H04N 5/232* (2013.01); *H04N 5/23216* (2013.01); *F16B 2001/0035* (2013.01); *G03B 17/02* (2013.01)

(56) References Cited

U.S. PATENT DOCUMENTS

| | | | |
|---|---|---|---|
| 2011/0117959 A1* | 5/2011 | Rolston | A46B 7/04 455/556.1 |
| 2014/0098225 A1* | 4/2014 | Rodriguez | G03B 15/03 348/143 |
| 2015/0042794 A1* | 2/2015 | Lin | H04N 5/2251 348/143 |
| 2015/0109470 A1* | 4/2015 | Yang | H04N 5/23209 348/211.9 |
| 2016/0138937 A1 | 5/2016 | Zhai | |
| 2016/0255251 A1* | 9/2016 | Urano | H04N 5/2252 348/143 |
| 2018/0041692 A1* | 2/2018 | Qin | H04N 5/23216 |

\* cited by examiner

VIDEO CAMERA, SETTING METHOD AND ADJUSTING METHOD THEREOF

This application claims the benefit of People's Republic of China application Serial No. 201610842351.6, filed Sep. 22, 2016, the subject matter of which is incorporated herein by reference.

BACKGROUND OF THE INVENTION

Field of the Invention

The invention relates in general to a video camera, a setting method and an adjusting method thereof, and more particularly to a video camera installed on a stand, a setting method and an adjusting method thereof.

Description of the Related Art

Along with the development of technology, various video cameras are provided one after another. The video camera can be used to monitor working environment or babies, or perform video conference. Therefore, the video camera can be used in a diversity of occasions.

When the user needs to install video cameras at many positions, several stands can be installed at different positions, and one video camera can be moved from one stand to another stand. However, after the user moves the video camera to a particular stand, the position and parameters of the video camera on the particular stand need to be re-adjusted for correctly and clearly capturing the region of interest (ROI). Generally speaking, such adjustment process is very complicated and time consuming, since the user needs to frequently check whether the frame captured by the video camera is correct and clear.

SUMMARY OF THE INVENTION

The invention relates to a video camera, a setting method and an adjusting method thereof. When the user installs a video camera on a stand, the user, according to the gravity acceleration obtained by an accelerometer, can automatically obtain the result of whether the installation position of the video camera on the stand is adjusted completely without having to frequently check the frame captured by the video camera. The video camera, the setting method and the adjusting method thereof are indeed very convenient.

According to a first aspect of the present invention, a setting method of a video camera is provided. The setting method of the video camera is for setting the video camera installed on a stand. The setting method includes following steps: Whether a trigger signal is received is determined. When the trigger signal is received, a vector set of a gravity acceleration on three coordinate axes is obtained by an accelerometer, and the vector set of the gravity acceleration is stored.

According to a second aspect of the present invention, an adjusting method of a video camera is provided. The adjusting method of the video camera is for adjusting an installation position of the video camera on a stand. The adjusting method includes following steps: A first vector set of a gravity acceleration on three coordinate axes pre-stored in the video camera is obtained. An angle, a direction or a position of the video camera is adjusted. A second vector set of the gravity acceleration of the video camera on the coordinate axes is obtained by an accelerometer in response to an adjustment of the angle, the direction or the position of the video camera. Whether the second vector set is substantially the same as the first vector set is determined. When the second vector set is substantially the same as the first vector set, it is concluded that the installation position of the video camera on the stand is completely adjusted.

According to the subcontractor aspect of the invention, a video camera is provided. The video camera is rotatably disposed on a stand. The video camera includes a body, a storage unit, an accelerometer and a processing unit. The storage unit is for pre-storing a first vector set of a gravity acceleration of the video camera on three coordinate axes. The accelerometer is for sensing a second vector set of the gravity acceleration of the video camera on the coordinate axes. The processing unit is for determining whether the second vector set is substantially the same as the first vector set. When the second vector set is substantially the same as the first vector set, the processing unit concludes that an installation position of the video camera on the stand is completely adjusted.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
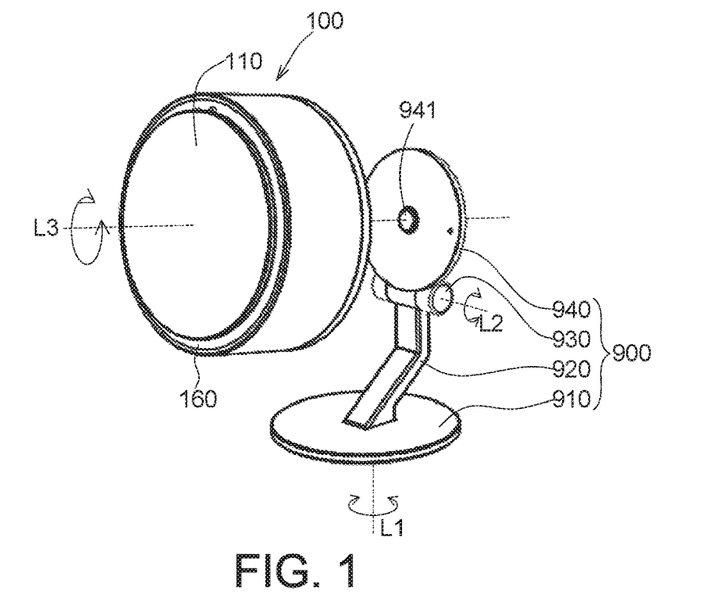
FIG. 1 is a front exploded view of a video camera and a stand according to an embodiment of the invention.
Figure 2:
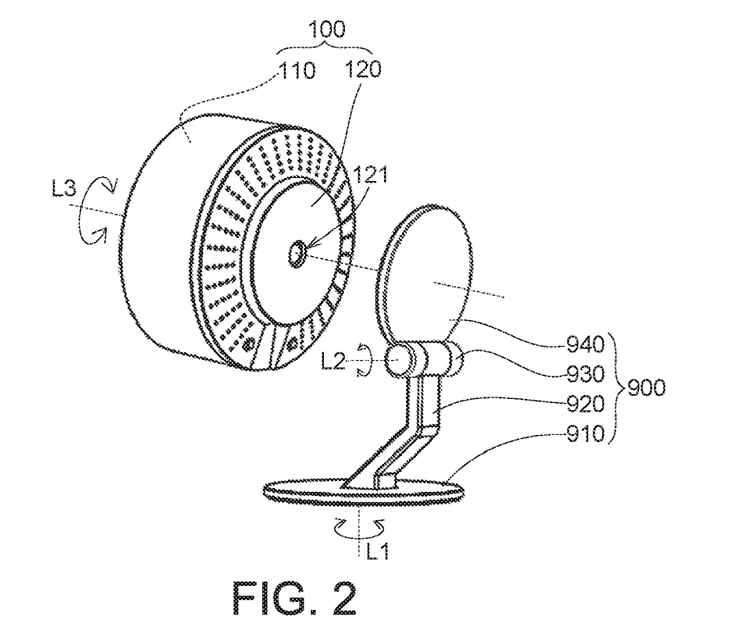
FIG. 2 is a back exploded view of the video camera and the stand of FIG. 1.

Refer to FIG. 1 and FIG. 2. FIG. 1 is a front exploded view of a video camera 100 and a stand 900 according to an embodiment of the invention. FIG. 2 is a back exploded view of the video camera 100 and the stand 900 of FIG. 1. The stand 900 includes a base 910, a support rod 920, a connection shaft 930 and a bearing plate 940. The base 910 can be disposed on a desktop or a wall, and can be rotated around a first axis L1. One end of the support rod 920 is connected to the base 910, and the other end of the support rod 920 is connected to the connection shaft 930. The bearing plate 940 is connected to the connection shaft 930. The bearing plate 940 is circular shaped. The connection shaft 930 can be rotated around a second axis L2.

The video camera 100 includes a body 110 and a connecting plate 120 (shown in FIG. 2). The connecting plate 120 is circular shaped. The connecting plate 120 has a recess 121 (shown in FIG. 2). The bearing plate 940 has a protrusion 941 (shown in FIG. 1). The protrusion 941 is engaged in the recess 121, such that the connecting plate 120 can be rotatably disposed on the bearing plate 940 and rotated around a third axis L3. The recess 121 is circular shaped, the protrusion 941 is also circular shaped, and the recess 121 and the protrusion 941 are mutually engaged, such that the body 110 can smoothly rotate with respect to the bearing plate 940. Thus, the video camera 100 can be rotatably disposed on the stand 900. Besides, the design of the recess 121 and the protrusion 941 lies in that the recess 121 and the protrusion 941 can be mutually engaged, such that the connecting plate 120 and the bearing plate 940 can be firmly jointed. The appearance of the recess 121 and the protrusion 941 is not limited to circular shaped.

Figure 3:
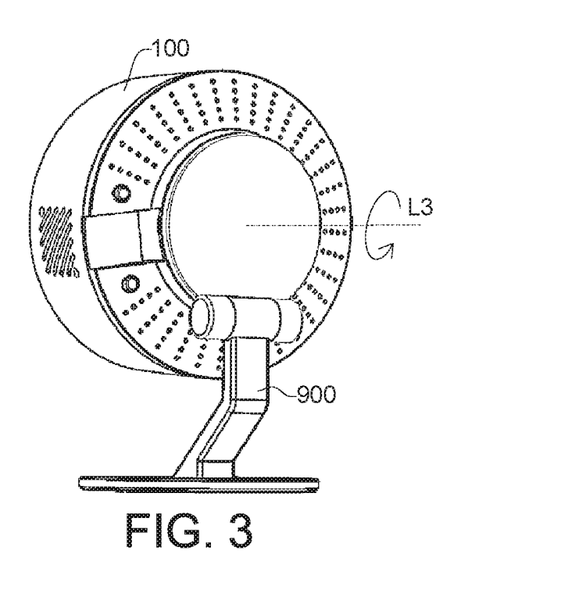
FIG. 3 and FIG. 4 are schematic diagrams of the video camera rotating around a third axis.
Figure 4:
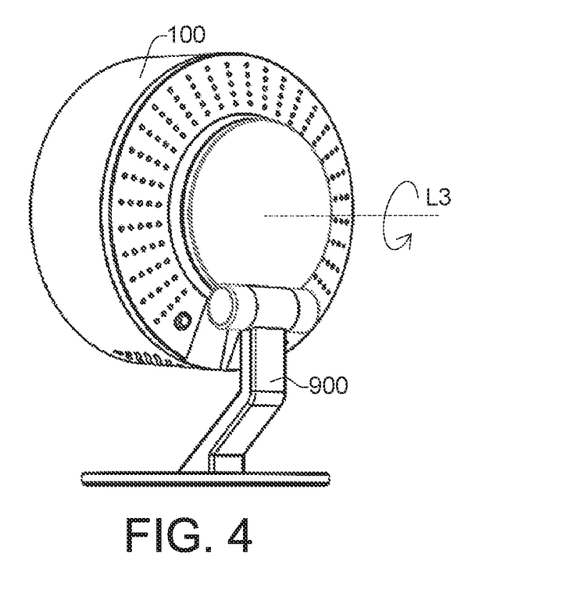

In an embodiment, the recess 121 is disposed at the center of the connecting plate 120, and the protrusion 941 is disposed at the center of the bearing plate 940. Refer to FIG. 3 and FIG. 4, which show schematic diagrams of the video camera 100 rotating around the third axis L3. The video camera 100 can be rotated around the third axis L3 for 360 degrees, and there is no offset generated between the video camera 100 and the third axis L3 when the video camera 100 is rotated around the third axis L3.

Moreover, one of the connecting plate 120 and the bearing plate 940 is formed of a ferromagnetic material (such as magnet), and the other one of the connecting plate 120 and the bearing plate 940 is formed of a ferromagnetic material (such as magnet) or a paramagnetic material (such as iron). Thus, when the user places the video camera 100 near the stand 900, the video camera 100 can be absorbed to the stand 900 by magnetism. In other words, the user can apply less force to the video camera 100 to dismount the video camera 100 from the stand 900 since the video camera 100 is attached on the stand 900 by magnetic attraction.

The user can install many stands 900 at home or work place, and can move the video camera 100 from one of the stands 900 to another stand 900 according to actual needs. Given that the rotation angle between the first axis L1 and the second axis L2 of the stand 900 is fixed and the video camera 100 is already installed on the stand 900, the user only needs to adjust the rotation angle of the video camera 100 with respect to the third axis L3 for enabling the video camera 100 to capture the region of interest (ROI).

Figure 5:
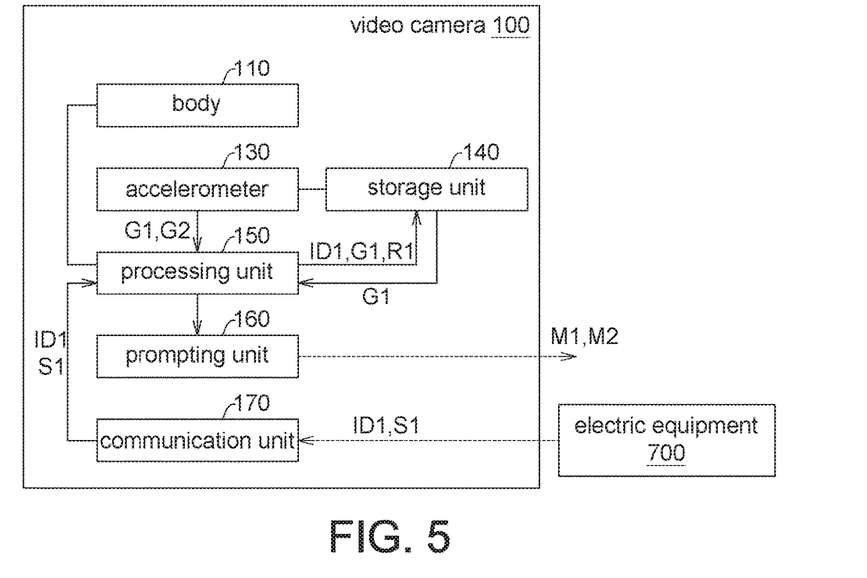
FIG. 5 is a block diagram of the video camera.

Refer to FIG. 5, which shows a block diagram of the video camera 100. The video camera 100 further includes an accelerometer 130, a storage unit 140, a processing unit 150, a prompting unit 160 and a communication unit 170 in addition to the body 110 and the connecting plate 120. The accelerometer 130 is for sensing a gravity acceleration. The storage unit 140 is electrically connected to the accelerometer 130 and the processing unit 150. The storage unit 140 is for storing various data, and can be realized by a memory, a hard disk, or a cloud center. The processing unit 150 is electrically connected to the body 110, the accelerometer 130, the storage unit 140, the prompting unit 160 and the communication unit 170. The processing unit 150 is for performing various calculation programs, processing routines, judgment programs and control programs, and can be realized by a microprocessor, a microcontroller, a chip, a circuit board, or a storage device storing a plurality of program codes. The prompting unit 160 is for sending various prompting signals, and can be realized by a light, a buzzer or a display panel. The communication unit 170 is for transmitting various data, and can be realized by a wireless transmission module (such as Bluetooth module, wireless network module, 3G/4G/5G network module, near field communication module or radio frequency identification module) or a wired transmission module (such as network cable or signal cable).

Figure 6:
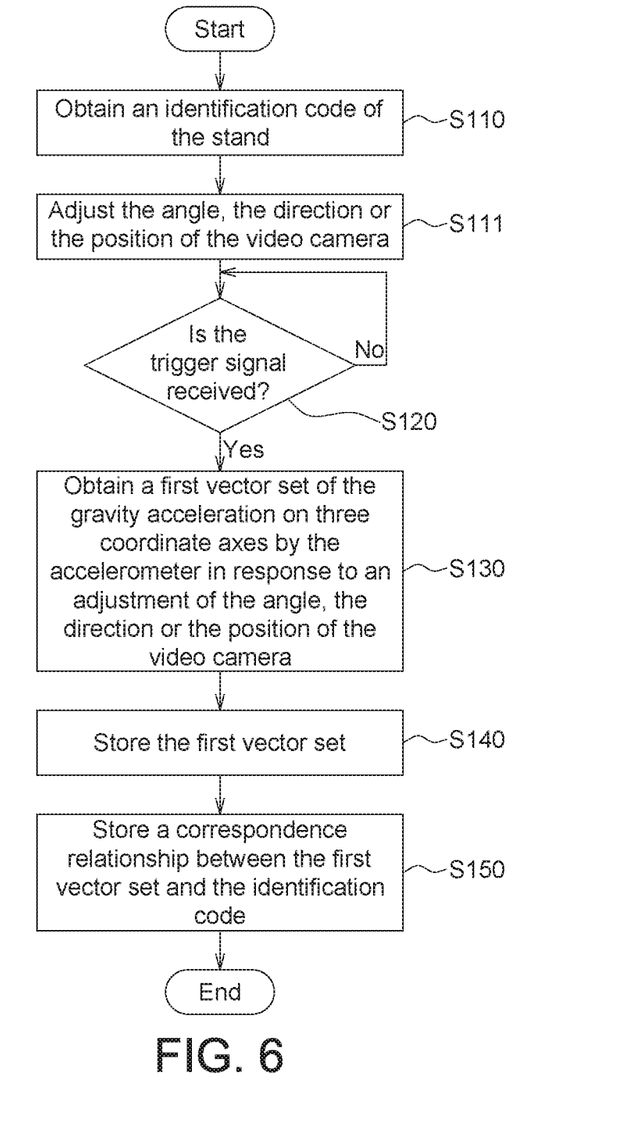
FIG. 6 is a flowchart of a setting method of the video camera according to an embodiment of the invention.

Refer to FIG. 6, which shows a flowchart of a setting method of the video camera 100 according to an embodiment of the invention. When using the video camera 100, the video camera 100 can transmit images or frames to an electrical equipment 700 by the communication unit 170. On a user interface of the electrical equipment 700, the user can view the images or frames currently captured by the video camera 100. When the video camera 100 is installed on the stand 900 for the first time, the user can check the captured images or frames to confirm whether the video camera 100 is rotated to the correct position and confirm whether the parameters (such as brightness value, saturation value, focal length value and focal position) are correct. Through the setting method of FIG. 6, the rotation position and the parameters of the video camera 100 can be recorded to facilitate the next installation of the video camera 100.

Firstly, the method begins at step S110, an identification code ID1 of the stand 900 is obtained by the processing unit 150. In the present step, the identification code ID1 can be obtained through the user interface of the electrical equipment 700. That is, the user can operate the user interface of the electrical equipment 700 to notify the processing unit 150 which stand 900 will the video camera 100 be installed on. Or, in another embodiment, a radio frequency identification (RFID) tag can be disposed on each stand 900. When the video camera 100 is absorbed on the stand 900, the video camera 100 can sense the RFID tag of the stand 900 to obtain the identification code ID1.

In step S111, the angle, the direction or the position of the video camera 100 can be adjusted by the user. As indicated in FIGS. 3 to 4, the video camera 100 is rotated around the third axis L3, such that the video camera 100 can shoot the region of interest (ROI). After installing the video camera 100 at a pre-determined position, the user can operate the user interface of the electrical equipment 700 to send a trigger signal S1 to the communication unit 170, which further transmits the trigger signal S1 to the processing unit 150. In another embodiment, a trigger button can be disposed on the video camera 100, and the user can press the trigger button to send the trigger signal S1 to the processing unit 150.

Then, the method proceeds to step S120, the processing unit 150 determines whether the trigger signal S1 is received. When the trigger signal S1 is received, this indicates that the user has completed the installation of the video camera 100, and the method directly proceeds to step S130. If the trigger signal S1 is not received, this indicates that the user has not yet completed the installation of the video camera 100, and the method repeats step S111 until the installation of the video camera 100 is completed.

Then, the method proceeds to step S130, a first vector set G1 of the gravity acceleration on three coordinate axes (such as X-axis, Y-axis, Z-axis mutually perpendicular to each other) is obtained by the accelerometer 130 in response to an adjustment of the angle, the direction or the position of the video camera 100.

Afterwards, the method proceeds to step S140, the first vector set G1 is stored in the storage unit 140 for the use in the next installation of the video camera 100.

Then, the method proceeds to step S150, a correspondence relationship R1 between the first vector set G1 and the identification code ID1 is stored. The correspondence relationship R1 can be realized by a comparison table for the use in the next installation of the video camera 100.

Through the setting method disclosed above, the correspondence relationship R1 between the first vector set G1 and the identification code ID1 is stored in the storage unit 140, such that the user, during the next installation of the video camera 100, can automatically obtain the result of whether the rotation position of the video camera 100 is correct without having to frequently check the frame.

Figure 7:
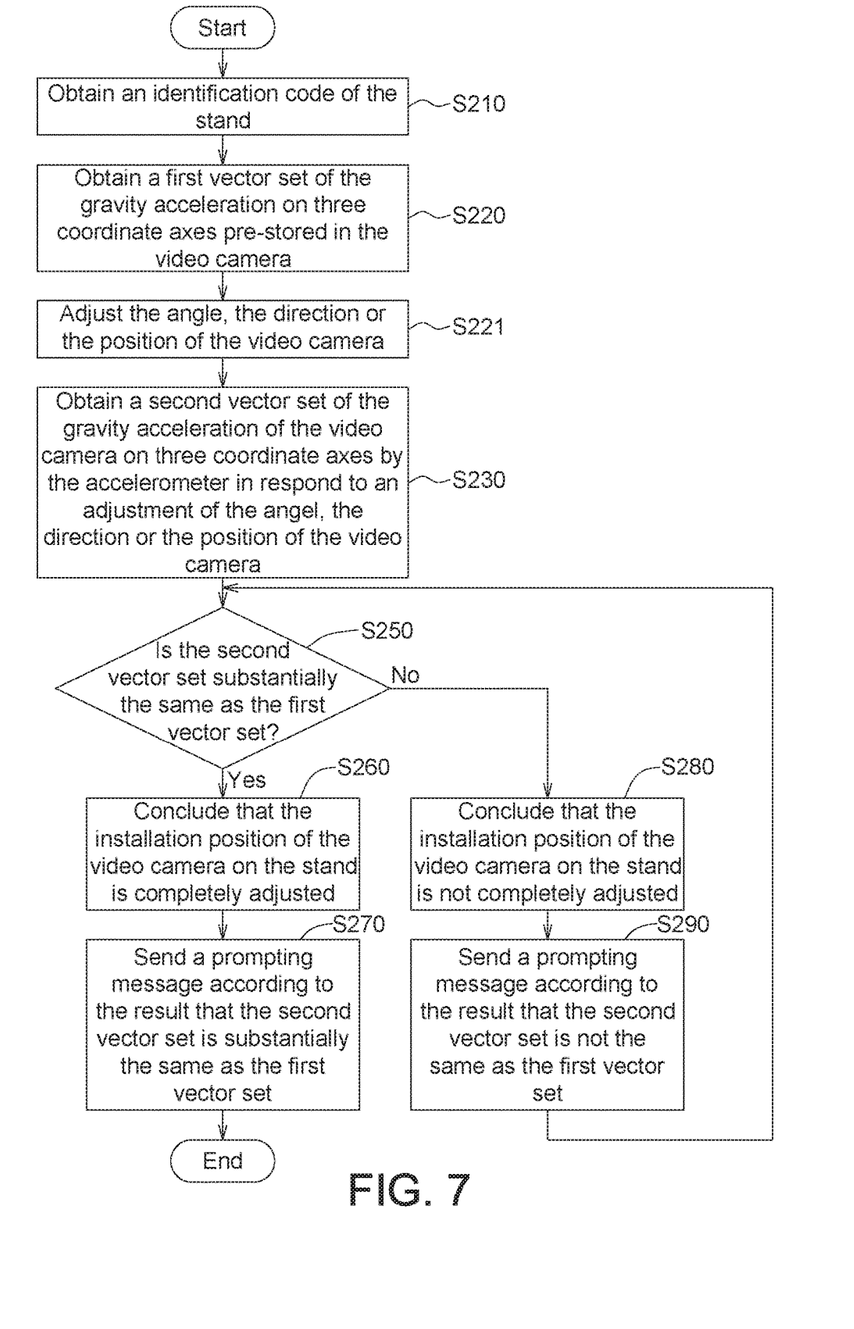
FIG. 7 is a flowchart of an adjusting method of the video camera according to an embodiment of the invention.

Details of the adjusting method of moving the video camera 100 to a particular stand 900 by the user are disclosed below. Refer to FIG. 7, which shows a flowchart of an adjusting method of the video camera 100 according to an embodiment of the invention. Firstly, the method begins at step S210, the identification code ID1 of the stand 900 is obtained by the processing unit 150. In the present step, the identification code ID1 can be obtained through the user interface of the electrical equipment 700. That is the user can operate the user interface to notify the processing unit 150 which stand 900 will the video camera be installed on. Or, in another embodiment, a radio frequency identification (RFID) tag can be disposed on each stand 900. When the video camera 100 is absorbed on the stand 900, the video camera 100 can sense the RFD tag of the stand 900 to obtain the identification code ID1.

In step S220, the first vector set G1 of the gravity acceleration on three coordinate axes pre-stored in the video camera 100 is obtained by the processing unit 150. In the present step, the processing unit 150 obtains the first vector set G1 from the storage unit 140 according to the correspondence relationship R1.

Then, the method proceeds to step S221, in the present embodiment, the angle, the direction or the position of the video camera 100 is adjusted by the user. As indicated in FIGS. 3 to 4, the video camera 100 is rotated around the third axis L3.

In step S230, a second vector set G2 of the gravity acceleration of the video camera 100 on three coordinate axes is obtained by the accelerometer 130 in response to an adjustment of the angle, the direction or the position of the video camera 100. The second vector set G2 varies with the rotation of the video camera 100.

Afterwards, the method proceeds to step S250, whether the second vector set G2 is substantially the same as the first vector set G1 is determined by the processing unit 150. In the present disclosure, the term "substantially" indicates various reasonable errors generated from the measurement and computation of the elements. When the second vector set G2 is substantially the same as the first vector set G1, the method proceeds to step S260. Otherwise, the method proceeds to step S280.

In step S260, the processing unit 150 concludes that the installation position of the video camera 100 on the stand 900 is completely adjusted.

Then, the method proceeds to step S270, the prompting unit 160 is controlled by the processing unit 150 to send a prompting message M1 according to the result that the second vector set G2 is substantially the same as the first vector set G1. As indicated in FIG. 1, the prompting unit 160 can be realized by a ring light. The prompting unit 160 can emit a green light prompting message M1 to indicate that the procedure for adjusting the installation position of the video camera 100 on the stand 900 is done.

In step S280, the processing unit 150 concludes that the installation position of the video camera 100 on the stand 900 is not completely adjusted.

Then, the method proceeds to step S290, the prompting unit 160 is controlled by the processing unit 150 to send another prompting message M2 according to the result that the second vector set G2 is not the same as the first vector set G1. As indicated in FIG. 1, the prompting unit 160 can be realized by a ring light. The prompting unit 160 can emit a red light prompting message M2 to indicate that the procedure for adjusting the installation position of the video camera 100 on the stand 900 is not finished.

That is, the user can determine whether the installation position of the video camera 100 on the stand 900 is completely adjusted by rotating the video camera 100 and checking whether the luminous color of the prompting unit 160 has changed to a green light from a red light at the same time. In the present embodiment, the luminous color of the prompting unit 160 switches between green and red. However, the above exemplification of the luminous color of the prompting unit 160 is not for limiting the luminous color of the prompting unit 160. In other words, based on design considerations or actual needs, the prompting unit 160 can have other luminous colors which can be clearly identified by the user.

In an embodiment, the prompting message M2 sent by the prompting unit 160 can contain a message of rotation direction. For example, the message of rotation direction informs the user whether he/she should rotate the video camera 100 clockwise or anticlockwise. The message of rotation direction is related to the difference between the second vector set G2 and the first vector set G1. For example, the message of rotation direction can be realized by a clockwise marquee which informs the user to rotate the video camera 100 clockwisely or realized by an anticlockwise marquee which informs the user to rotate the video camera 100 anticlockwisely.

In an embodiment, the prompting message M2 sent by the prompting unit 160 can contain a message of rotation angle. The message of rotation angle is related to the difference between the second vector set G2 and the first vector set G1. For example, the larger the flickering rate of marquee, the larger the angle of rotation.

Through the setting method and the adjusting method disclosed above, when moving the video camera 100 to a particular stand 900, the user can automatically obtain the result of whether the installation position of the stand 900 on the video camera 100 is completely adjusted without having to frequently check the frame.

Figure 8:
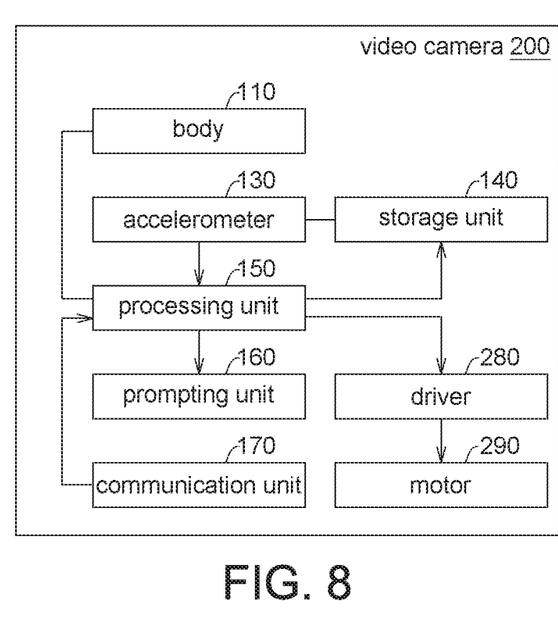
FIG. 8 is a block diagram of a video camera according to another embodiment.
Figure 9:
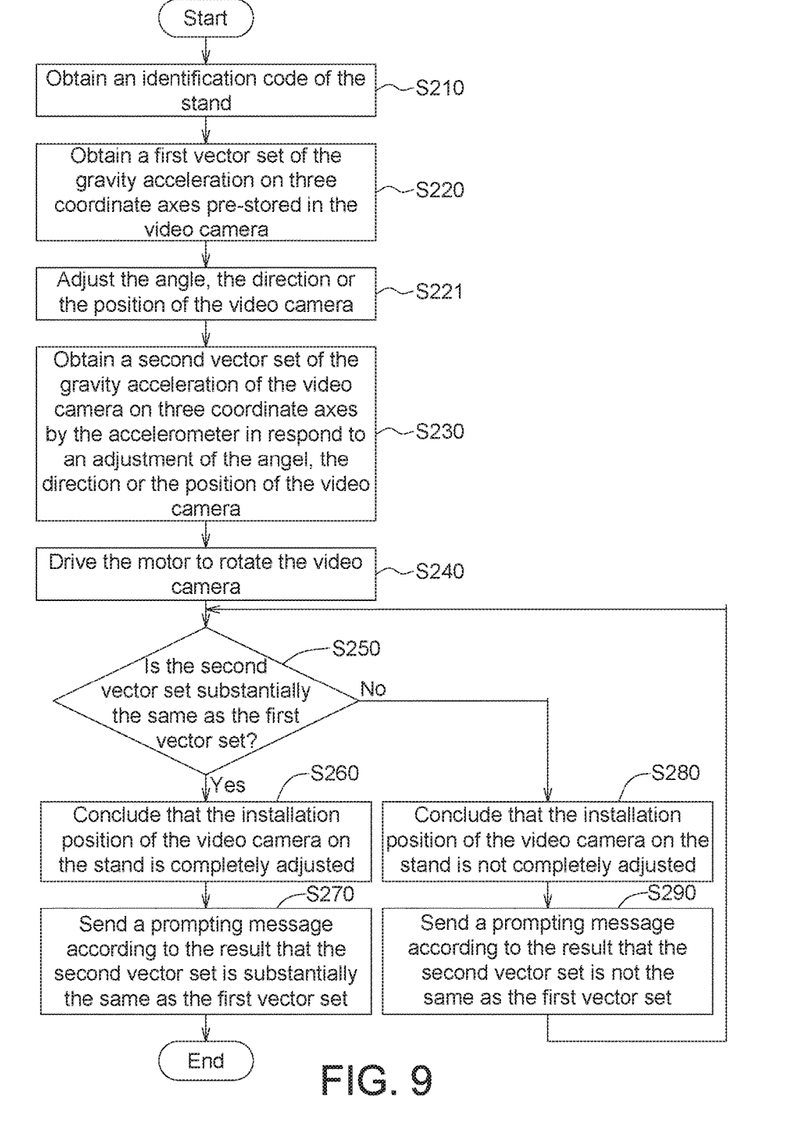
FIG. 9 is a flowchart of an adjusting method of a video camera according to another embodiment.

Refer to FIG. 8 and FIG. 9. FIG. 8 is a block diagram of a video camera 200 according to another embodiment. FIG. 9 is a flowchart of an adjusting method of the video camera 200 according to another embodiment. In another embodiment, the video camera 200 further includes a driver 280 and a motor 290. The user does not need to rotate the video camera 200 manually. The video camera 200 can be rotated by the motor 290. Following step S230 of obtaining the second vector set G2, the method proceeds to step S240. In step S240, the driver 280 is controlled by the processing unit 150 to drive the motor 290 to rotate the video camera 200. In addition, when the second vector set G2 is substantially the same as the first vector set G1, the driver 280 stops driving the motor 290, and the motor 290 stops rotating the video camera 200.

In the present step, a driving direction of the motor 290 can be related to the difference between the second vector set G2 and the first vector set G1. For example, the processing unit 150 can directly determine whether the driving direction should be clockwise or anticlockwise according to the difference between the second vector set G2 and the first vector set G1.

In the present step, a driving time of the motor 290 can be related to the difference between the second vector set G2 and the first vector set G1. For example, the processing unit 150 can directly determine the duration of the driving time according to the difference between the second vector set G2 and the first vector set G1, such that the video camera 200 can be directly rotated to the correct position.

Figure 10:
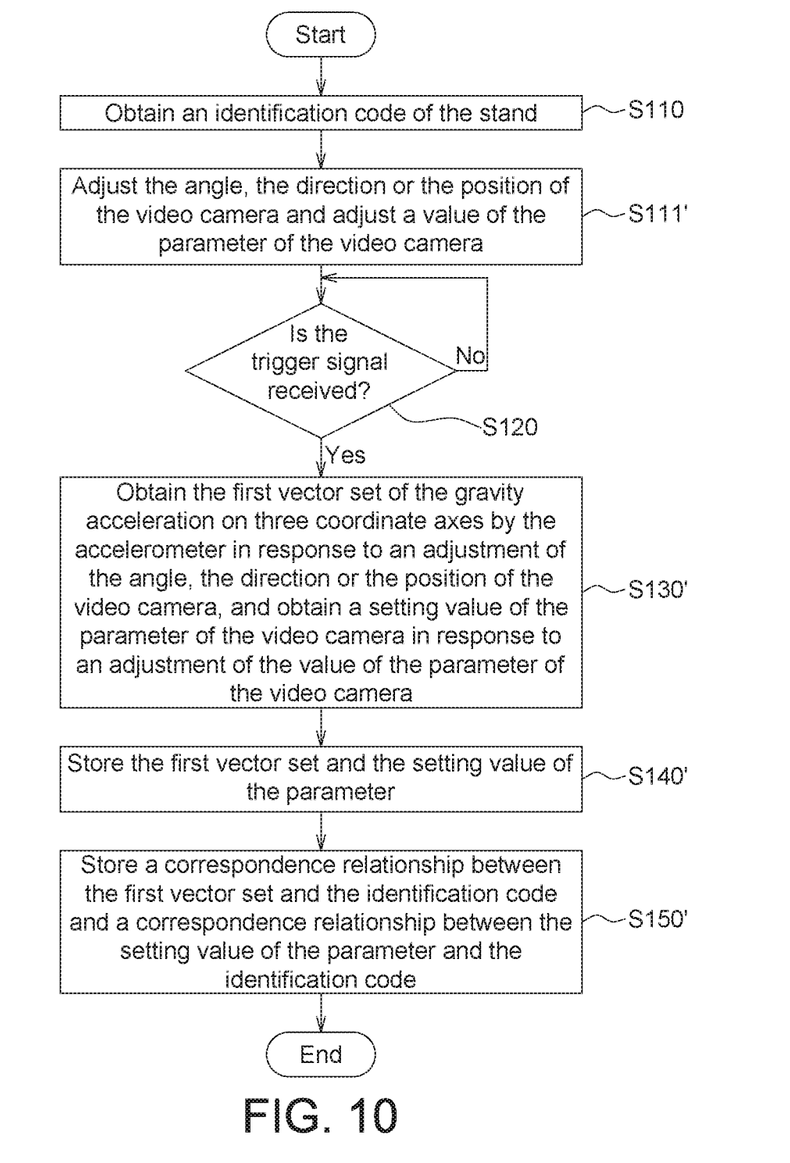
FIG. 10 is a flowchart of a setting method of a video camera according to another embodiment of the invention.

Through the setting method and the adjusting method disclosed above, the user can obtain the result of whether the installation position of the video camera 100 on the stand 900 on is completely adjusted. In another embodiment, through the setting method and the adjusting method disclosed below, the user can obtain the result of whether various parameters of the video camera 100 are completely set. Refer to FIG. 10, which shows a flowchart of a setting method of the video camera 100 according to another embodiment of the invention. The setting method of the video camera 100 of FIG. 10 is different from the setting method of the video camera 100 of FIG. 6 in steps S111', S130', S140' and S150'.

In step S111', the user further adjusts a value of a parameter, such as a first brightness value, a first saturation value, a first focal length value and a first focal position, of the video camera 100. After the installation position and various parameters of the video camera 100 are completely adjusted, the video camera 100 can transmit the trigger signal S1.

In step S130', an adjusted value of the parameter, such as the first brightness value, the first saturation value, the first focal length value and the first focal position, is also obtained in addition to the first vector set G1 in response to an adjustment of the value of the parameter of the video camera 100.

In step S140', the setting value of the parameter, such as the first brightness value, the first saturation value, the first focal length value and the first focal position, is also stored in addition to the first vector set G1.

In S150', the stored correspondence relationship R1 further contains corresponding information of the setting value of the parameter, such as the first brightness value, the first saturation value, the first focal length value and the first focal position, and the identification code ID1.

Figure 11A:
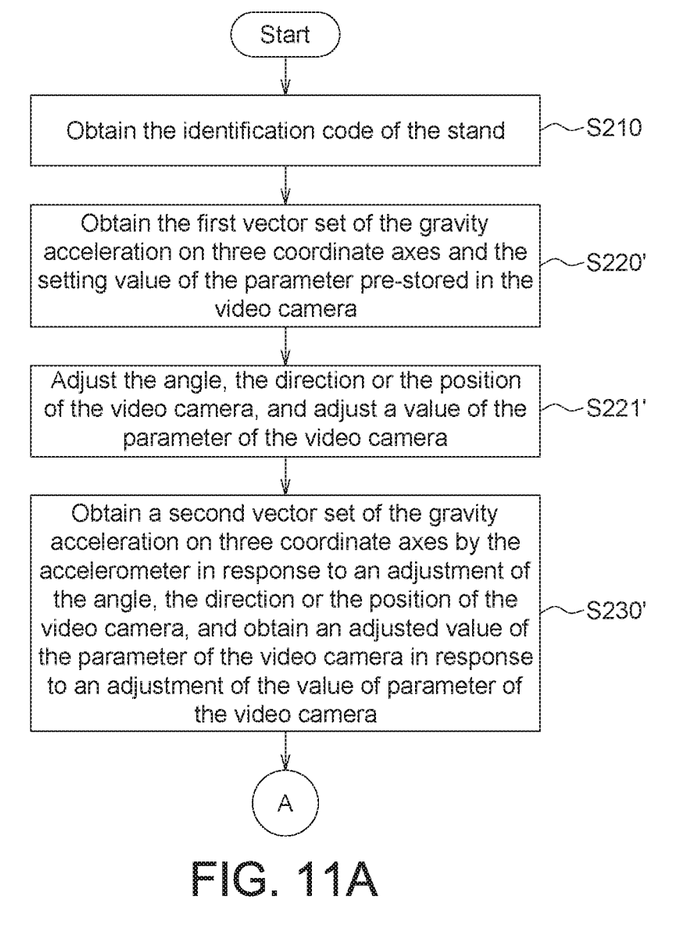
FIGS. 11A to 11B are flowcharts of an adjusting method of a video camera according to another embodiment of the invention.
Figure 11B:
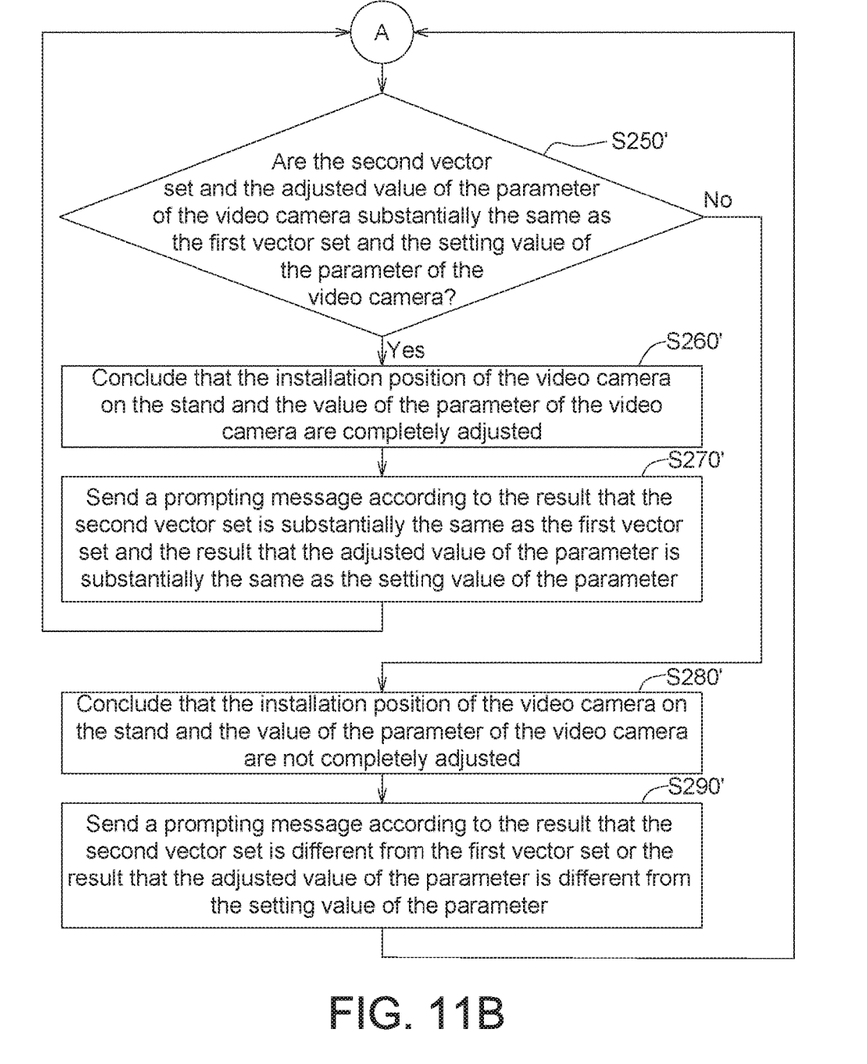

Refer to FIGS. 11A to 11B, which show flowcharts of an adjusting method of the video camera 100 according to another embodiment of the invention. The adjusting method of the video camera 100 of FIGS. 11A to 11B are different from the adjusting method of the video camera 100 of FIG. 7 in steps S220', S221', S230', S250', S260', S270', S280', and S290'.

In step S220', the pre-stored setting value of the parameter, such as the first brightness value, the first saturation value, the first focal length value and the first focal position, is also obtained in addition to the pre-stored first vector set G1.

In step S221', a value of the parameter, such as a second brightness value, a second saturation value, a second focal length value and a second focal position, of the video camera 100 in addition to the angle, the direction or the position of the video camera 100 is also adjusted by the user.

In step S230', in addition to the second vector set G2, an adjusted value of the parameter, such as the second brightness value, the second saturation value, the second focal length value and the second focal position, of the video camera 100 is obtained in response to an adjustment of the value of the parameter.

In step S250', whether the adjusted value of the parameter, such as the second brightness value, the second saturation value, the second focal length value and the second focal position, is substantially the same as the setting value of the parameter, such as the first brightness value, the first saturation value, the first focal length value and the first focal position, is determined in addition to whether the second vector set G2 is substantially the same as the first vector set G1.

In step S260', the processing unit 150 concludes that the installation position of the video camera 100 on the stand 900 is completely adjusted and the value of the parameter is completely adjusted.

In step S270', the prompting message M1 is sent by the processing unit 150 according to the result that the second vector set G2 is substantially the same as the first vector set G1 and the result that the adjusted value of the parameter, such as the second brightness value, the second saturation value, the second focal length value and the second focal position, is substantially the same as the setting value of the parameter, such as the first brightness value, the first saturation value, the first focal length value and the first focal position.

In step S280', the processing unit 150 concludes that the installation position of the video camera 100 on the stand 900 and the parameters are not completely adjusted.

In step S290', the prompting message M2 is sent by the processing unit 150 according to the result that the second vector set G2 is different from the first vector set G1 or the result that the adjusted value of the parameter, such as the second brightness value, the second saturation value, the second focal length value and the second focal position, is different from the setting value of the parameter, such as the first brightness value, the first saturation value, the first focal length value and the first focal position.

Through the setting method and the adjusting method disclosed above, the user, during the next installation of the video camera 100, can automatically obtain the result of whether the rotation position of the video camera 100 is correct and the result of whether the setting of various parameters of the video camera 100 is correct without having to frequently check the frame.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjusting method of a video camera for adjusting an installation position of the video camera on a stand, wherein the adjusting method comprises:

obtaining an identification code of the stand;

obtaining a first vector set of a gravity acceleration on three coordinate axes pre-stored in the video camera, wherein in the step of obtaining the first vector set, the first vector set is obtained according to a correspondence relationship between the first vector set of the gravity acceleration and the identification code;

adjusting an angle, a direction or a position of the video camera;

obtaining a second vector set of the gravity acceleration of the video camera on the coordinate axes by an accelerometer in response to an adjustment of the angle, the direction or the position of the video camera;

determining whether the second vector set is the same as the first vector set; and concluding that the installation position of the video camera on the stand is adjusted completely when the second vector set is the same as the first vector set.

2. The adjusting method of the video camera according to claim 1, further comprising:
obtaining a setting value of a parameter pre-stored in the video camera;
adjusting a value of the parameter of the video camera;
obtaining an adjusted value of the parameter of the video camera in response to an adjustment of the value of the parameter of the video camera;
determining whether the setting value is the same as the adjusted value; and
concluding that the value of the parameter of the video camera is adjusted completely when the setting value is the same as the adjusted value.

3. The adjusting method of the video camera according to claim 1, further comprising:
sending a prompting message according to a result of whether the second vector set is the same as the second vector set.

4. The adjusting method of the video camera according to claim 3, wherein when the second vector set is different from the first vector set, the prompting message contains a message of rotation direction or a message of rotation angle, which are related to a difference between the second vector set and the first vector set.

5. A video camera rotatably disposed on a stand, wherein the video camera comprises:
a body;
a communication unit for obtaining an identification code of the stand;
a storage unit for storing a first vector set of a gravity acceleration of the video camera on three coordinate axes;
an accelerometer for sensing a second vector set of the gravity acceleration of the video camera on the coordinate axes; and
a processing unit for obtaining the first vector set from the storage unit according to a correspondence relationship between the first vector set of the gravity acceleration and the identification code and determining whether the second vector set is the same as the first vector set, wherein when the second vector set is the same as the first vector set, the processing unit concludes that an installation position of the video camera on the stand is completely adjusted.

6. The video camera according to claim 5, further comprising:
a connecting plate having a recess, wherein the stand has a bearing plate having a protrusion engaged in the recess, such that the connecting plate is rotatably disposed on the bearing plate.

7. The video camera according to claim 6, wherein one of the connecting plate and the bearing plate is formed of a ferromagnetic material, and the other one of the connecting plate and the bearing plate is formed of a ferromagnetic material or a paramagnetic material.

8. The video camera according to claim 5, further comprising:
a prompting unit for sending a prompting message according to a result of whether the second vector set is the same as the first vector set.

9. The video camera according to claim 8, wherein the prompting unit is a ring light.

10. The video camera according to claim 8, wherein when the second vector set is different from the first vector set, the prompting message contains a message of rotation direction or a message of rotation angle, which are related to a difference between the second vector set and the first vector set.

11. The video camera according to claim 5, further comprising:
a motor for rotating the video camera; and
a driver for driving the motor, wherein a driving direction and a driving time of the motor are related to a difference between the second vector set and the first vector set.

* * * * *